US005322140A

United States Patent [19]

Bussinger

[11] Patent Number: 5,322,140

[45] Date of Patent: Jun. 21, 1994

[54] STEERING SYSTEMS FOR FOUR-WHEELED CARTS

[75] Inventor: Allen L. Bussinger, Saginaw, Mich.

[73] Assignee: Amigo Mobility International, Inc., Bridgeport, Mich.

[21] Appl. No.: 829,497

[22] Filed: Feb. 3, 1992

[51] Int. Cl.[5] .......... B62K 1/00

[52] U.S. Cl. .......... 180/65.1; 180/79; 180/79.3; 180/907

[58] Field of Search .......... 180/79, 79.3, 6.5, 65.1, 180/DIG. 907; 280/250.1, 304.1

[56] References Cited

U.S. PATENT DOCUMENTS

| | | | |
|---|---|---|---|
| 3,061,031 | 10/1962 | Packard | 180/65.1 |
| 4,633,962 | 1/1987 | Cox et al. | 180/65.1 |
| 4,798,255 | 1/1989 | Wu . | |
| 4,887,685 | 12/1989 | Shepard et al. . | |
| 4,953,645 | 9/1990 | Körber et al. | 180/6.5 |

FOREIGN PATENT DOCUMENTS

| | | |
|---|---|---|
| 1087225 | 10/1967 | United Kingdom . |

*Primary Examiner*—Mitchell J. Hill

*Attorney, Agent, or Firm*—Learman & McCulloch

[57] ABSTRACT

A four-wheeled cart, for physically challenged individuals has a frame that is propelled and supported by two driven rear wheels. An operator's seat is mounted on the rear portion of the frame. A generally flat platform, a part of which is inclined upwardly and forwardly, supports the operator's feet. A steerable front wheel on a vertical spindle is mounted on each corner of the front portion of the frame. The front wheels are steered by a toothed wheel assembly clamped to each vertical spindle under the flat platform, a torque transmission gear drive interconnecting the two toothed wheel assemblies, and a drive mechanism for turning the torque transmission gear drive. The drive mechanism can be a manual handle bar or an electric motor controlled by a joy stick. With the joy stick control, the flat platform is completely clear and allows the cart to move the operator up to work areas such as tables. The manual handle bar takes minimal space above the flat platform. The clamped friction connection between the toothed wheel assemblies and the vertical spindles allows the spindles to turn in the toothed wheel assemblies to prevent damage when a steered wheel strikes an obstruction.

22 Claims, 4 Drawing Sheets

FIG-1
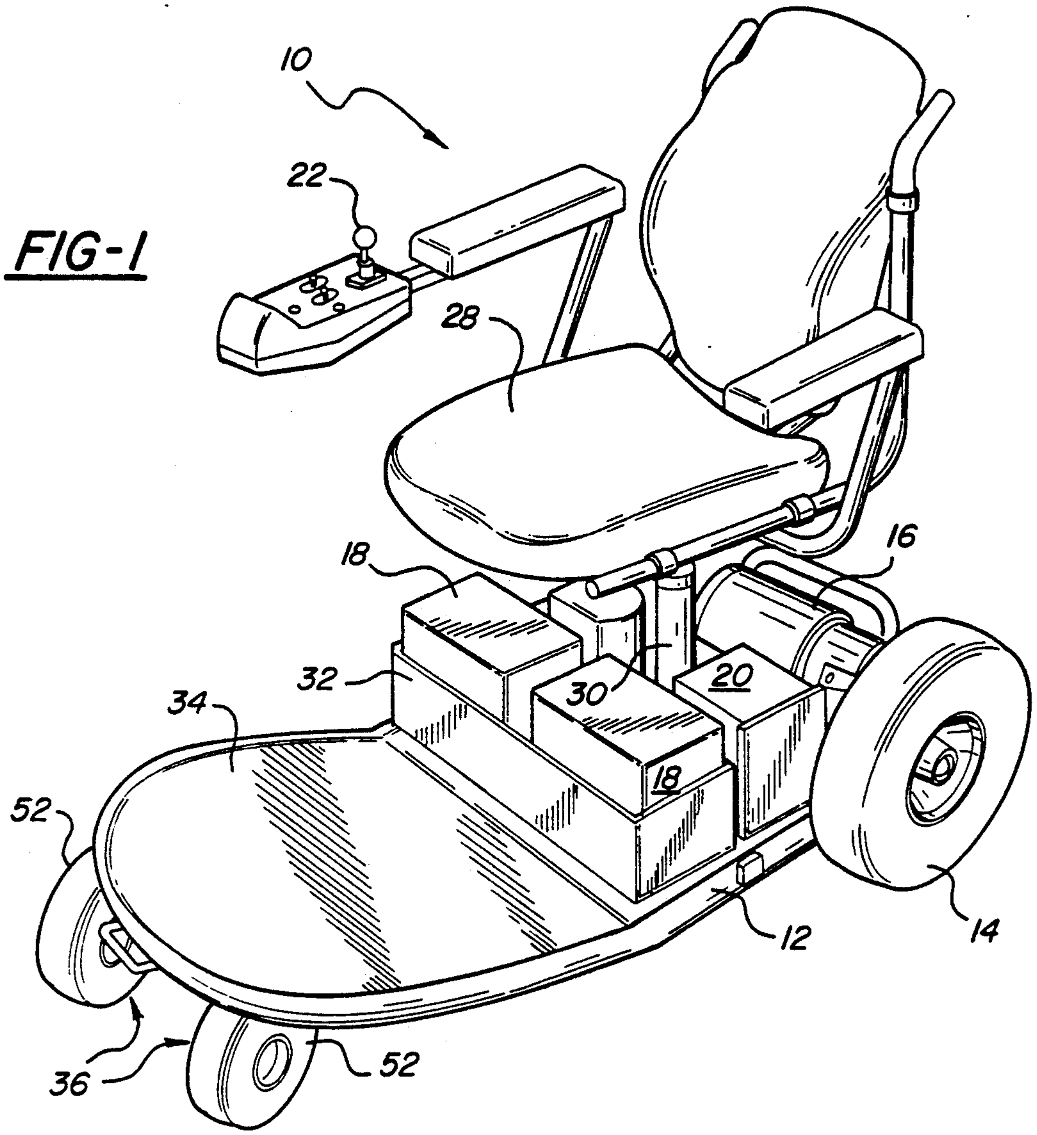
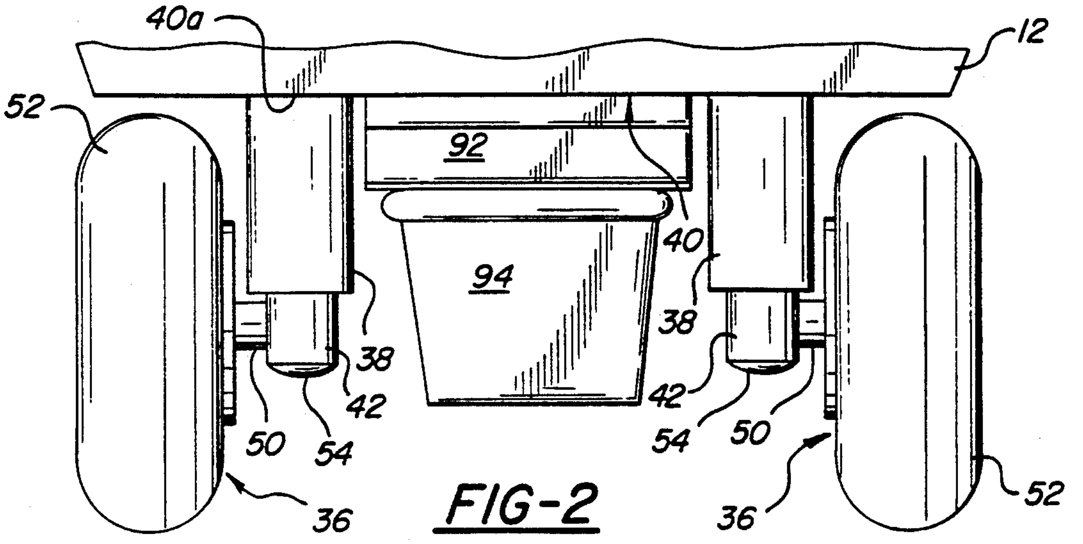
FIG-2

STEERING SYSTEMS FOR FOUR-WHEELED CARTS

FIELD OF THE INVENTION

The invention relates to a four-wheeled carriage of the type used as a transportation aid by physically challenged individuals and others desiring to ride, and more specifically to a steering system for such a four-wheeled carriage.

BACKGROUND OF THE INVENTION

Vehicles for physically challenged individuals have taken many forms. A common form includes a frame supported by two electrically driven rear wheels, and a single front steered wheel. A seat is mounted on the frame to the front of and above the two driven wheels. The single front steered wheel is connected to and steered by a T-shaped steering handle bar.

The addition of a second steered wheel to increase vehicle stability has been proposed. At least one design (see U.S. Pat. No. 4,887,685, which is incorporated herein by reference), has two steered wheels mounted on a front axle. The front axle is pivoted about a fore and aft horizontal axis to keep all four wheels in contact with the surface over which the vehicle travels. The horizontal axis the axle pivots about reduces stability. The two steered wheels have been steered by a steering system with a plurality of arms interconnected by tie rods. The system of arms and tie rods controls the steered wheels well. However, the steering system has some serious drawbacks. One of the drawbacks is a limited turning radius. Another one of the drawbacks is a requirement for substantial vertical space. Vertical space requirements conflict with the requirement to keep the top of the foot rest surface or platform low and unobstructed. A platform which is low and unobstructed is relatively easy to mount and dismount. Such a platform can also allow physically challenged individuals better access to tables and various types of work stations.

SUMMARY OF THE INVENTION

An object of the invention is to provide a four-wheeled carriage that is more stable and has an improved turning radius.

Another object of the invention is to provide a four-wheeled carriage steering system for steering two wheels, that is positive and requires minimal space.

A further object of the invention is to provide a four-wheeled carriage with a steering system that employs gears to transmit steering torque.

A still further object of the invention is to provide a four-wheeled carriage with a steering system that can be operated manually or electrically.

The four-wheeled carriage includes a frame supported by four wheels. Two rear wheels are driven by an electric motor. An operator's seat is mounted on the frame generally above the two rear driven wheels. A pair of steered wheel assemblies support the front portion of the frame. Each steered wheel assembly includes a spindle rotatably journaled on the front portion of the frame for pivotal movement about a generally vertical axis. An axle shaft is secured to the spindle. A frame support wheel is rotatably journaled on the axle shaft for rotation about a generally horizontal axis. A toothed gear is clamped to the spindle. The clamp or friction connection between the toothed gear and the spindle allows rotation of the spindle relative to the toothed gear in the event of a torque overload on the spindle. A torque overload can occur if the steered wheels strike an obstruction such as a curb. By providing friction connections between the toothed gears and the spindles, the shock from striking an obstruction can be absorbed and damage to the carriage can be avoided.

A steering gear is mounted on the frame between the two spindles. The steering gear can mesh with the toothed gears on both of the spindles to steer both wheels. When the steering gear is in mesh with the toothed gears clamped to the spindles, the steering gear may be turned by an electric motor. The electric motor drives the steering gear through a speed reduction gear train. The electric motor for steering is controlled by a joy stick or a similar controller.

The steering gear mounted on the frame between the two spindles can also be connected to a handle bar and rotated manually. When the steering gear is rotated manually, the steering gear is not in mesh with the toothed gears on the spindles. A right side idler gear is in mesh with the steering gear and with the toothed gear clamped to the spindle on the right side of the frame. A left side idler gear is in mesh with the steering gear and with the toothed gear clamped to the spindle on the left side of the frame. The purpose of the right and left side idler gears is to rotate the toothed gears clamped to the spindles in the same direction that the steering gear is turned.

Other objects and advantages of the invention will become apparent from the following description when it is considered in conjunction with the accompanying drawings.

THE DRAWINGS

FIG. 1 is a perspective view of a motorized four-wheeled carriage for physically challenged individuals with two steered wheels and a joy stick steering controller;

FIG. 2 is an enlarged, fragmentary, front elevational view of the lower portion of the cart;

DETAILED DESCRIPTION

Figure 6:
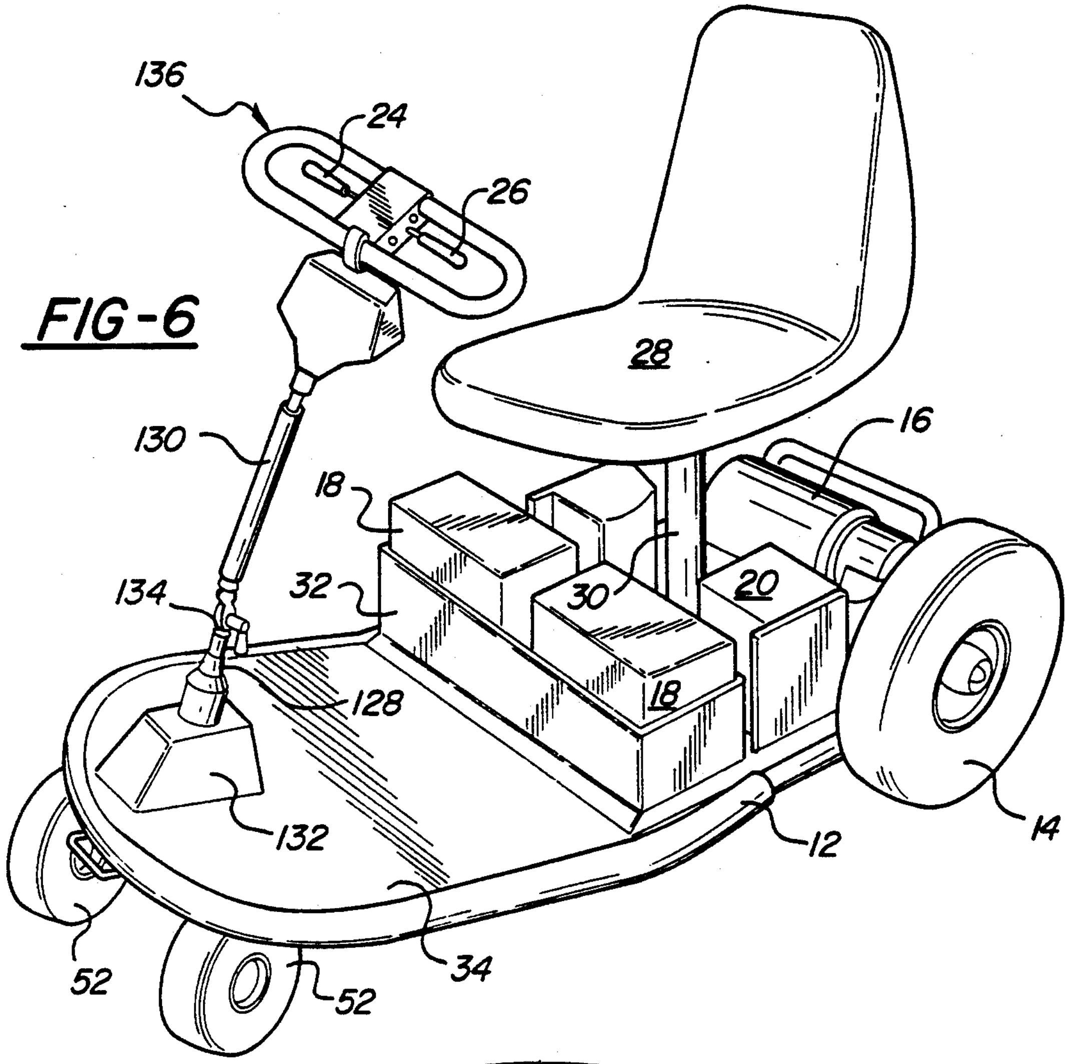
FIG. 6 is a perspective view of a motorized four-wheeled carriage for physically challenged individuals with two steered wheels and a handle bar for steering both steered wheels.

The motorized four-wheeled cart or carriage 10 for physically challenged individuals has a frame 12. The rear portion of the frame is supported by a pair of driven rear wheels 14 mounted on a differential axle. A reversible electric motor 16, mounted on the rear portion of the frame 12, drives the rear wheels 14 to propel the carriage 10. The motor 16 receives current from batteries 18. The flow of current from the batteries to the electric motor 16 is controlled by a solid state, integrated circuit programmable controller 20. Such controllers are obtainable from Curtis Instruments of Dublin, Ca. and others. The controller 20 is controlled either by the joy stick 22 shown in FIG. 1, or by the speed control levers 24 and 26 shown in FIG. 6. The speed control levers 24 and 26 both perform the same function. One is for operation by one hand of an operator and the other is for operation by the other hand of an operator. The speed control levers 24 and 26 and the joy stick 22 control speed and direction. If the operator releases the joy stick 22 or the speed control levers 24 and 26, current to the reversible electric motor 16 is cut off and the carriage 10 stops moving.

An operator's seat 28 is supported on the rear section of the frame 12 by a support 30. The operator's seat 28 is normally provided with adjustment means (not shown) for adjusting the height of the operator's seat 28 and for rotation of the seat 28 about a generally vertical axis. By turning the seat to one side or the other, it is easier to mount or dismount from the carriage. The support 30 is secured to the frame 12 between the two driven rear wheels 14 and slightly forward of the axis of rotation of the two driven rear wheels. In this position, the operator's seat is generally above the rear wheels 14 so that the operator's weight is mostly supported by the rear wheels 14.

The frame 12 extends forwardly and is inclined slightly upwardly from a location near the forward edge of the operator's seat 28 and near the forward edge of the battery box 32. The top of the frame 12, forward of the battery box 32, is covered with a generally flat, forwardly and upwardly inclined deck 34. The deck 34 is inclined upwardly and forwardly at a slight angle to provide operator comfort, and to provide vertical space for two steered wheel assemblies generally designated 36.

Each steered wheel assembly 36 has a spindle support sleeve 38 rigidly secured to a support plate 40 attached to the bottom surface of the frame 12 on the forward portion of the carriage 10. Each spindle support sleeve 38 extends vertically downward from a generally horizontal portion 40*a* of the support plate 40. A tubular spindle 42 is rotatably journaled in each spindle support sleeve 38 by an upper bushing 44 and a lower bearing 46 which permit pivotal movement of each spindle about a generally vertical axis. The spindle 42 on the right-hand side of the frame 12 as seen by the operator of the cart 10 can be referred to as the first spindle. The spindle 42 on the left-hand side of the frame 12 as seen by the operator of the cart 10 can be referred to as the second spindle. A washer shaped stop member 48 welded to the spindle 42 contacts the bottom surface of the lower bearing 46 to limit vertical movement of the spindle 42 up into the spindle support sleeve 38. An axle shaft 50 extends horizontally outwardly from the bottom portion of each tubular spindle 42 and a steerable frame supporting front wheel 52 is rotatably journaled on each axle shaft 50 to support the front portion of the cart or carriage 10. The wheel 52 on the axle shaft 50 secured to the first spindle 42 can be referred to as the first steerable frame supporting front wheel. The wheel 52 on the axle shaft 50 secured to the second spindle 42 can be referred to as the second steerable frame supporting front wheel. An axle shaft 50 is preferably attached to each tubular spindle 42 by welding. A cap 54 closes the bottom end of each of the tubular spindles 42 below an axle shaft 50.

A toothed wheel assembly shown as a gear 56 slides over the upper end of the tubular spindle 42 on the left-hand side of the carriage 10. A pair of half ring members 58 and 60 are clamped together by horizontal bolts 62 which frictionally connects them to the upper end of the left-hand tubular spindle 42 above the toothed gear 56. Vertical bolts 64 secure the half ring member 58 to the toothed gear 56. The toothed gear 56 is thereby positioned above the gear plate 65 and adjacent to the upper end of the spindle support sleeve 38. The half ring members 58 and 60, which are clamped to the upper end of the spindle 42 normally prevent rotation of the tubular spindle 42 relative to the toothed gear 56 and hold the tubular spindle in the spindle support sleeve 38. However, if too much torque is applied to the left-hand tubular spindle 42, it will slip and turn inside the half ring members 58 and 60 to prevent damage to the tubular spindle or other parts of the left-hand steered wheel assembly 36.

A toothed wheel assembly shown as a gear 66 slides over the upper end of the tubular spindle 42 on the right-hand side of the carriage 10. A pair of half ring members 68 and 70 are clamped together by horizontal bolts 62 which frictionally connects them to the upper end of the right-hand tubular spindle 42 above the toothed gear 66. Vertical bolts 64 secure the half ring member 68 to the toothed gear 66. The toothed gear 66 is thereby positioned above the gear plate 65 and adjacent to the upper end of the spindle support sleeve 38. The half ring members 68 and 70, which are clamped to the upper end of the right-hand tubular spindle 42, normally prevent rotation of the tubular spindle relative to the toothed gear 66 and hold the tubular spindle in the spindle support sleeve 38. However, if too much torque is applied to the right-hand tubular spindle 42, it will slip and turn inside the half ring members 68 and 70 to prevent damage to the tubular spindle 42 or other parts of the right-hand steered wheel assembly 36. This may occur if the vehicle wheel strikes a curb or other obstruction with undue force.

Figure 3:
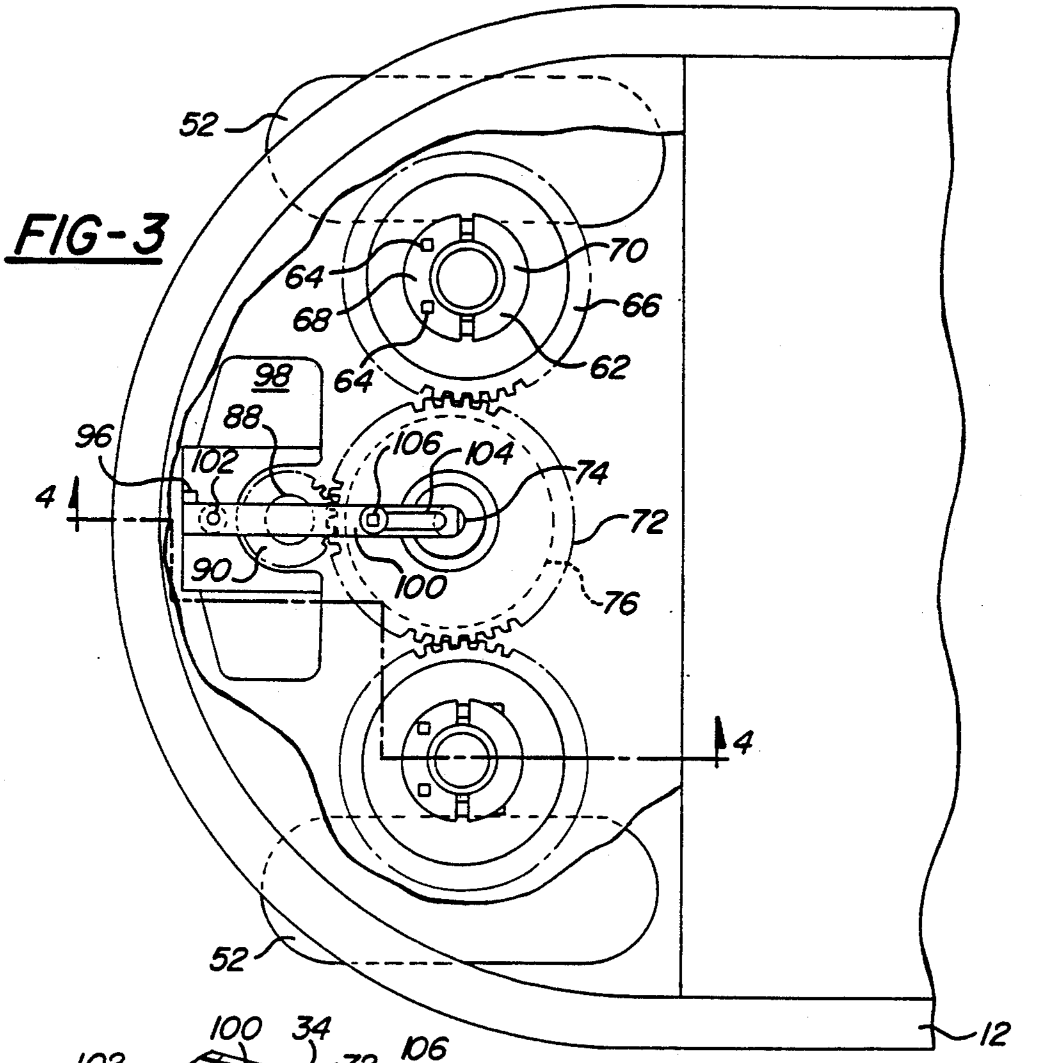
FIG. 3 is a fragmentary plan view of the steering systems for the steered wheels, with parts broken away to better show components of the steering system.
Figure 4:
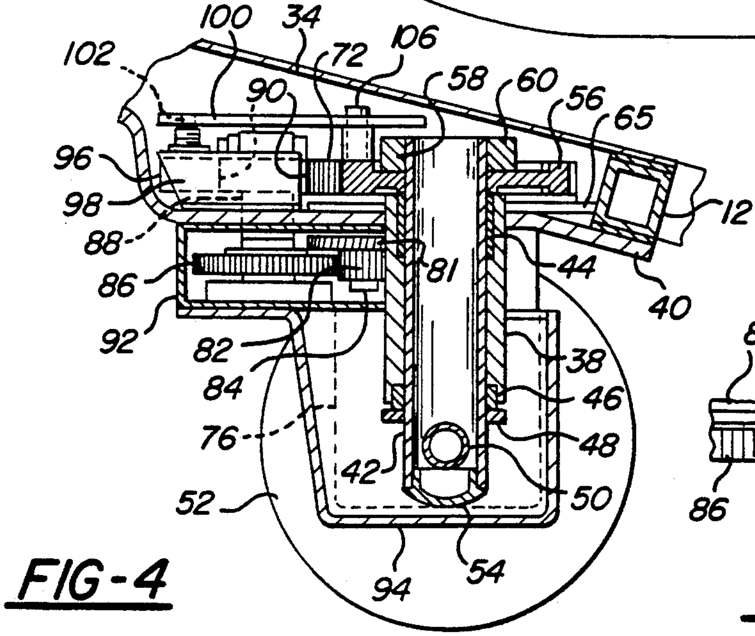
FIG. 4 is a vertical sectional view taken along the line 4—4 in FIG. 3.
Figure 7:
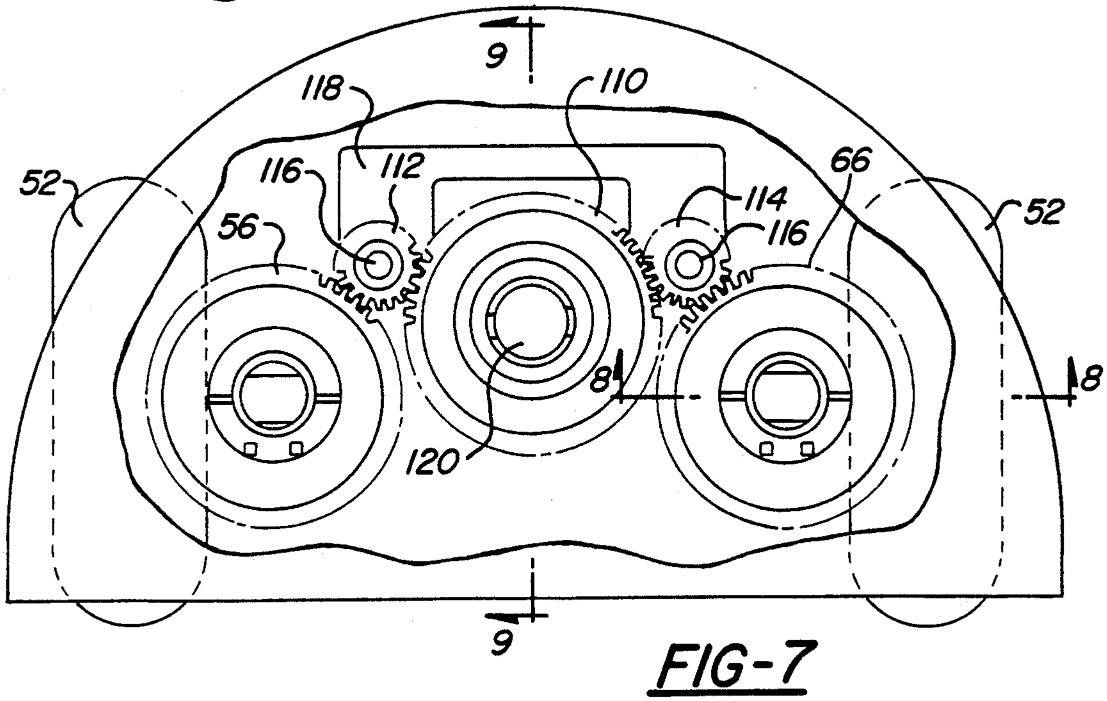
FIG. 7 is an enlarged plan view of the front portion of the cart shown in FIG. 6, with parts broken away to show some of the steering system components.
Figure 8:
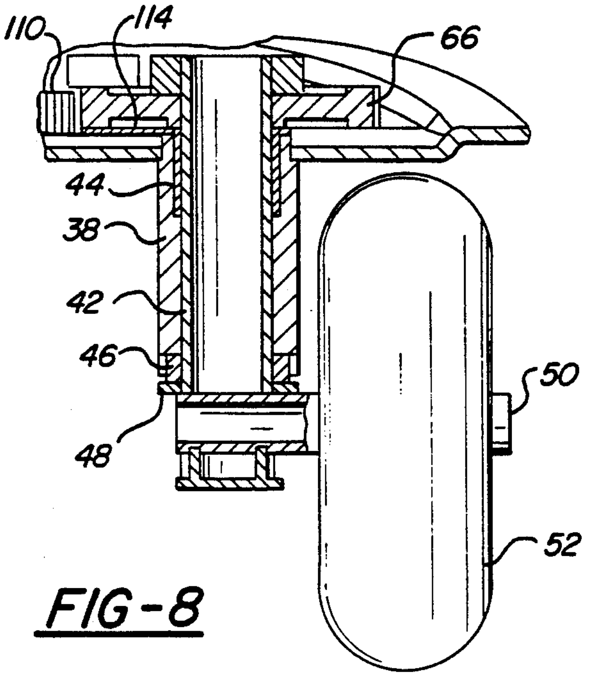
FIG. 8 is a fragmentary sectional elevational view taken along line 8—8 in FIG. 7.

A steering gear 72, shown in FIG. 3, is rotatably journaled on a fixed shaft 74 that is secured to the gear plate 65. As shown in FIG. 3, the steering gear 72 is a spur gear in mesh with the toothed gear 56 and the toothed gear 66. The steering gear 72 is a torque transmission mechanism which transmits torque between the gear 66 on the first spindle 42 and the gear 56 on the second spindle. The steering gears 110, 112 and 114 shown in FIG. 7 are also a torque transmission mechanism that transmits torque to the gear 56 and 66 as explained below. When the steering gear 70 turns in one direction, the toothed gears 56 and 66 turn in the opposite direction, and the two tubular spindles 42 turn together in the same direction as the toothed gears 56 and 66 about the generally vertical axes of the tubular spindles 42. The steered wheels 52 thus turn together in the same direction.

Figure 5:
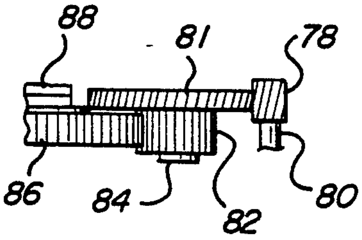
FIG. 5 is an enlarged, fragmentary, side elevational view of some of the reduction gears that are hidden or partially hidden by a spindle in FIG. 4.

The steering gear 72 is turned by a reversible electric motor 76 mounted under the support plate 40. The electric motor 76 is controlled by the joy stick 22 which directs current to the electric motor 76 from the batteries 18 to run the reversible electric motor 76 in one direction or the other. The reversible electric motor 76 has a helical pinion gear 78 integrated with its output shaft 80 as shown in FIG. 5. Torque is transmitted from the helical pinion gear 78 to the steering gear 72 through a speed reduction gear train. The speed reduction gear train includes a helical gear 81, driven by the helical pinion gear 78, and a gear 82 integrated with gear 81 that rotates about the shaft axis of a shaft 84 which is secured in any acceptable manner to the bottom of the support plate 40 and the gear plate 65. The helical gear 81 and the gear 82 are connected together and the gear 82 drives a gear 86 that is attached to a shaft 88. The shaft 88 is rotatably journaled in the gear plate 65 above the support plate 40 and extends upwardly through the support plate. A gear 90 is secured to the shaft 88 above the gear plate 65 and meshes with the steering gear 72. The gears 78, 80, 81, and 86 below the support plate 40 may be enclosed in a housing 92 of limited height. The reversible electric motor 76 is supported by the housing 92. A cover 94 that is also attached to the housing 92 protects the reversible electric motor 76.

In operation, the joy stick 22 returns to a centered position when it is released by the operator. In the centered position, the electric motor 16, which drives the rear wheels 14, stops running and the carriage 10 comes to a stop. The steered wheels 52 are also turned to direct the carriage 10 straight forward or backward when the joy stick 22 is in the centered position. A feedback potentiometer 96 is supported in front of the gear 90 by a support bracket 98 attached to the support plate 40. A control arm 100 is secured to the rotary input shaft 102 of the potentiometer 96 and extends rearwardly and above the steering gear 72. A slot 104 in the control arm engages a pin 106 that extends down through the slot 104 and is connected to the steering gear 72. The pin 106 moves the control arm 100 when the steering gear 72 is turned to permit the potentiometer 96 to send an electrical signal to the controller 20. The controller 20 compares the position of the joy stick 22 with the position of the steered wheels 52 as indicated by the feedback potentiometer 96, and then runs the electric motor 76 to steer the steered wheels 52 to the position indicated by the joy stick 22. Potentiometer 96 returns the wheels 52 to straight ahead position when the joy stick 22 is released and the joy stick spring returns the joy stick to a neutral position.

The employment of a joy stick 22 to control the electric motor 76 that turns the steered wheels 52 makes it possible to provide a deck that is entirely clear of obstructions. The clear deck 34 makes it easier for an operator of the carriage 10 to move onto and off the operator's seat 28. It also makes it possible to move the carriage 10 up to and under a table or other work area.

Referring now to the second handle bar-steered embodiment of the invention, the steering gear 110, shown in FIG. 7, as a spur year does not mesh with the toothed gear 56 on the left side tubular spindle 42 or the toothed gear 66 on the right side tubular spindle 42. A first idler gear 112 meshes with the toothed gear 56 and with the steering gear 110. A second idler gear 114 meshes with the steering gear 110 and the toothed gear 66. The first and second idler gears 112 and 114 are rotatably journaled on pins 116 that are secured to a plate 118. The plate 118 may be secured to the support plate 40 by bolts. The purpose of the idler gears 112 and 114 is to reverse the direction of rotation so that the steering gear 110 and the toothed gears 56 and 66 turn together in the same direction. The steering gear 110 and the idler gears 112 and 114 are a torque transmission mechanism which transmits torque between the gear 66 on the first spindle 42 and the gear 56 on the second spindle. The steering gear 110 and the idler gears 112 and 114 also transmit torque to the gear 56 and the gear 66 when the steering gear 110 is turned as explained below.

The steering gear 110 is rotatable about the axis of a fixed pin or shaft 120 that is secured to the gear plate 65. The steering gear 110 is held on the fixed pin or shaft 120 by a retainer such as a lock ring. A universal joint (not shown) is attached to the steering gear 110 by screws. A sleeve 128 is secured to the upper portion of the universal joint. A manual handle bar 130 is attached to the sleeve 128 by an adjustable joint 134. The adjustable joint 134 provides fore and aft adjustment of the upper end of the manual handle bar 130. A cover housing 132 is provided to protect the universal joint and the steering gear 110 and to position the sleeve 128. Speed and direction control levers 24 and 26 are mounted on the handle member 136 of the manual handle bar 130.

Figure 10:
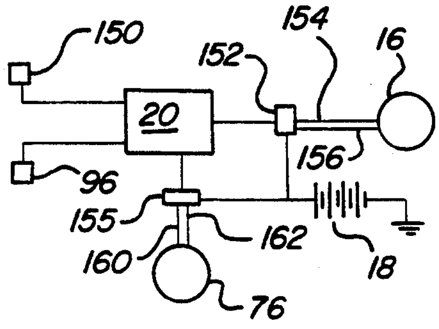
FIG. 10 is a schematic view of the electrical control system for the motorized four-wheeled carriage.
Figure 9:
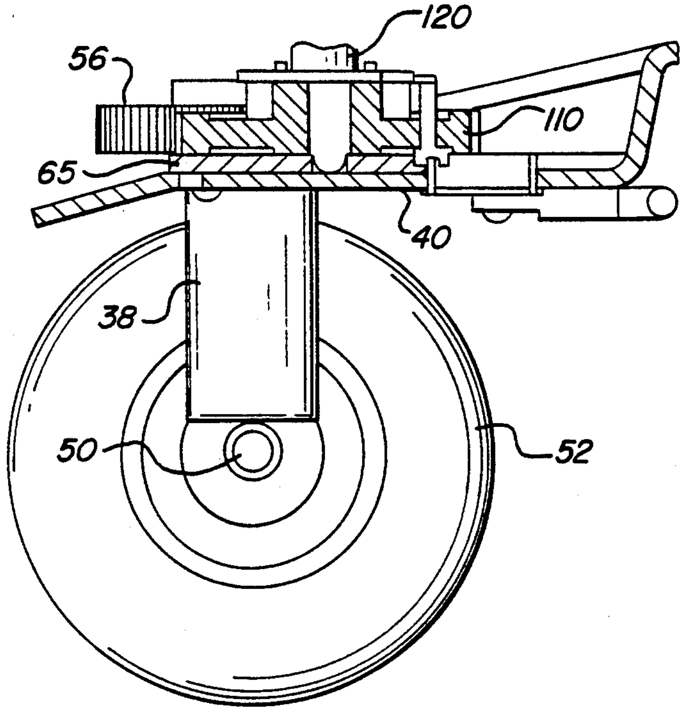
FIG. 9 is a fragmentary sectional elevational view taken along line 9—9 in FIG. 7.

The control circuit as shown schematically in FIG. 10 includes a solid state integrated circuit programmable controller 20. The controller 20 receives an operator input signal from a controller input 150. The controller input 150 is the joy stick 22 or the speed control levers 24 and 26. When the controller input 150 sends a signal to the controller 20 for forward or reverse movement of the carriage 10, the controller 20 sends an electrical signal to a relay 152 which connects the reversible electric motor 16 to the batteries 18 to run the reversible electric motor in the desired direction. The direction depends on the direction the control lever 24 or the control lever 26 is moved or if the joy stick 22 is moved toward the front or toward the rear. The speed at which the reversible electric motor 16 runs depends upon the current supplied to the motor. The current supplied from the batteries 18 to the reversible electric motor 16 is proportional to the fore or aft displacement of the joy stick 22 or the displacement of one of the control levers 24 or 26. The controller 20 determines the speed desired by the controller input 150 and sends a signal to the relay 152 to direct the required current from the batteries 18 to the reversible electric motor 16 through the line 154 for forward movement or the line 156 for reverse movement.

When the controller input 150 is a joy stick 22, the controller 20 also steers the steered wheel assemblies 36. A movement of the joy stick 22 to the right, for example, causes the controller 20 to send a signal to the relay 155. The relay 155 in response to a signal from the controller 20 directs current to the reversible electric motor 76 from the batteries 18 through the line 160 to run the reversible electric motor in the proper direction to steer the steered wheel assemblies 36 to the right. A movement of the joy stick 22 to the left causes the controller 20 to send a signal to the relay 155. The relay 155 in response to the signal from the controller 20 directs current to the reversible electric motor 76 from the batteries 18 through the line 162 to run the reversible electric motor in the proper direction to steer the steered wheel assemblies 36 to the left. The degrees of rotation of the steered wheel assemblies 36 to the right or the left is directly proportional to the distance the joy stick 22 is moved to the right or left. The feedback potentiometer 96 sends a signal to the controller 20 indicating the position of the steered wheel assemblies 36. The controller 20 will send a signal to the relay 155 to stop the reversible electric motor 76 after the steered wheel assemblies 36 have been turned to a position which corresponds to the position of the joy stick 22. If the operator releases the joy stick 22, it will automatically return to a centered position and the controller 20 will activate the relay 155 to run the reversible electric motor 76 until the feedback potentiometer indicates that the steered wheel assemblies 36 have been turned to steer the carriage 10 straight forward or straight to the rear.

Most of the weight of the carriage 10 and most of the weight of a carriage operator is supported by the rear wheels 14. When the carriage 10 moves on a surface which is not level, the rear wheels 14 will remain on the surface and one of the steered wheels 52, will be lifted from the surface. This arrangement has been found to provide substantial stability. Both steered wheels 52 are vertically fixed relative to the frame 12 and the three point support when one wheel is lifted will hold up the deck 34 and prevent tipping. The tubular spindles 42 are positively positioned by the gear trains that interconnect them when both or only one of the steered wheels 52 is in contact with a support surface.

The invention has been described in detail in connection with the preferred embodiments but these embodiments are merely examples only and the invention is not restricted thereto. It will be easily understood by those skilled in the art that variations can be made within the scope of the invention as defined by the claims.

I claim:

1. A four-wheels cart, for physically challenged individuals and other desiring assistance, including a frame with a left side, a right side, a front and a rear; a pair of wheels rotatably journaled on the'rear portion of the frame, a drive motor on the frame connected to at least one of the rear wheels for propelling the cart; a first spindle rotatably journaled on the front portion of the frame for pivotal movement about a generally vertical axis, a generally horizontal axle shaft secured to the first spindle, a first steerable frame supporting front wheel rotatably journaled on the axle shaft secured to the first spindle for rotation about a generally horizontal axis, a toothed wheel assembly attached to the first spindle for turning the first spindle about the generally vertical axis; a second spindle rotatably journaled on the front portion of the frame for pivotal movement about a generally vertical axis, a generally horizontal axle shaft secured to the second spindle, a second steerable frame supporting front wheel rotatably journaled on the axle shaft secured to the second spindle for rotation about a generally horizontal axis, and a toothed wheel assembly attached to the second spindle for turning the second spindle about the generally vertical axis; a torque transmission mechanism connected to the toothed wheel assembly secured to the first spindle and to the toothed wheel assembly secured to the second spindle operable to simultaneously turn the first and second spindles together about their generally vertical axes to steer the cart in the same direction; and a drive mechanism connected to the torque transmission mechanism for turning the torque transmission mechanism to steer the first and second steerable frame supporting front wheels.

2. The four-wheeled cart, for physically challenged individuals and others desiring assistance, as set forth in claim 1 wherein the toothed wheel assembly attached to the first spindle is attached by a friction connection that allows turning of the first spindle relative to the attached toothed wheel assembly in response to torque overloads on the first spindle.

3. The four-wheeled cart, for physically challenged individuals and others desiring assistance, as set forth in claim 2, wherein the toothed wheel assembly attached to the second spindle is secured by a friction connection that allows turning of the second spindle relative to the attached toothed wheel assembly in response to torque overloads on the second spindle.

4. The four-wheeled cart, for physically challenged individuals and other desiring assistance, as set forth in claim 1 wherein said torque transmission mechanism includes a spur gear that is in mesh with the toothed wheel assembly secured to the first spindle and in mesh with the toothed wheel assembly secured to the second spindle.

5. The four-wheeled cart, for physically challenged individuals and other desiring assistance, as set forth in claim 4 wherein said drive mechanism for operation of the spur gear that is in mesh with the toothed wheel assembly secured to the first spindle and the toothed wheel assembly secured to the second spindle, includes a reversible electric motor with an output gear mounted on the frame and connected to the spur gear by a gear train; and a control circuit for controlling the electric motor.

6. The four-wheeled cart, for physically challenged individuals and others desiring assistance, ass et forth in claim 5 wherein the gear train connecting the electric motor with the spur gear is a speed reduction gear train.

7. The four-wheeled cart, for physically challenged individuals and others desiring assistance, as set forth in claim 5 wherein said drive mechanism for controlling the electric motor includes a potentiometer mounted on the frame and operably connected to the first and second spindles for determining the position of the first and second steerable frame supporting front wheels.

8. The four-wheeled cart, for physically challenged individuals and others desiring assistance, as set forth in claim 1 wherein said torque transmission mechanism includes a steering gear pivotally attached to the cart frame, a left side idler gear in mesh with the toothed wheel assembly attached to the first spindle and in mesh with the steering gear, and a right side idler gear in mesh with the toothed wheel assembly attached to the second spindle and in mesh with the steering gear.

9. The four-wheeled cart, for physically challenged individuals and others desiring assistance, as set forth in claim 8 wherein said drive mechanism includes a handle bar assembly attached to the steering gear for manually turning the steering gear to steer the first and second steerable frame supporting front wheels.

10. The four-wheeled cart, for physically challenged individuals and others desiring assistance as set forth in claim 1, including a potentiometer mounted on the frame, a potentiometer control arm extending outwardly from the potentiometer, and a connection between the torque transmission mechanism and the potentiometer control arm in response to movement of the torque transmission mechanism.

11. A four-wheeled cart, for physically challenged individuals and others desiring assistance, including a frame with a left side, a right side, a front and a rear; an operator's seat mounted on the rear portion of the frame; a generally flat platform on a front portion of the frame having a portion for supporting the feet of an operator; a pair of wheels rotatably journaled on the rear portion of the frame, a drive motor mounted on the frame and connected to at least one of the rear wheels for propelling the cart; a first spindle rotatably journaled on the front portion of the frame for pivotal movement about a generally vertical axis, a generally horizontal axle shaft secured to the first spindle, a first steerable frame supporting front wheel rotatably journaled on the first spindle axle shaft for rotation about a generally horizontal axis, a first drive wheel assembly attached to the first spindle and positioned under the front portion of said generally flat platform for turning the first spindle about the generally vertical axis; a second spindle rotatably journaled on the front portion of the frame for pivotal movement about a generally vertical axis, a generally horizontal axle shaft secured to the second spindle, a second steerable frame supporting front wheel rotatably journaled on the second spindle axle shaft for rotation about a generally horizontal axis, and a second drive wheel assembly attached to the second spindle and positioned under the front portion of said generally flat platform for turning the second spindle about the generally vertical axis; a torque transmission drive wheel mechanism in the horizontal plane of said drive wheel assemblies mounted on the frame and positioned under the front portion of said generally flat platform and simultaneously connected to the drive wheel assembly secured to the first spindle and to the drive wheel assembly secured to the second spindle and operable to simultaneously turn the first and second spindles together about their generally vertical axes to steer the cart in the same direction; and a drive mechanism connected to the torque transmission mechanism for turning the torque transmission mechanism to steer the first and second steerable frame supporting front wheels.

12. The four-wheeled cart, for physically challenged individuals and others desiring assistance, as set forth in claim 11 wherein at least a portion of said generally flat platform on the front portion of the frame is inclined upwardly and forwardly.

13. The four-wheeled cart, for physically challenged individuals and others desiring assistance, as set forth in claim 11 wherein the first drive wheel assembly attached to the first spindle is attached by a friction connection that allows turning of the first spindle relative to the attached first drive wheel assembly in response to torque overloads on the first spindle.

14. The four-wheeled cart, for physically challenged individuals and others desiring assistance as set forth in claim 13, wherein the second drive wheel assembly attached to the second spindle is secured by a friction connection that allows turning of the second spindle relative to the attached second drive wheel assembly in response to torque overloads on the second spindle.

15. The four-wheeled cart, for physically challenged individuals and others desiring assistance, as set forth in claim 14 wherein said torque transmission drive wheel mechanism includes a spur gear, rotatably supported on the frame under said generally flat platform, and in mesh with the first and second drive wheel assemblies secured to the first and second spindles.

16. The four-wheeled cart, for physically challenged individuals and others desiring assistance as set forth in claim 15 wherein said drive mechanism, for operation of the spur gear that is in mesh with the first and second drive wheel assemblies secured to the first and second spindles, includes a reversible electric motor with an output gear mounted on the frame and connected to the spur gear by a gear train; and a control circuit for controlling the electric motor.

17. The four-wheeled cart, for physically challenged individuals and others desiring assistance, as set forth in claim 16 wherein said reversible electric motor is mounted on the frame under said generally flat platform.

18. The four-wheeled cart, for physically challenged individuals and others desiring assistance as set forth in claim 17 wherein the gear train connecting the electric motor with the spur gear is a speed reduction gear train.

19. The four-wheeled cart, for physically challenged individuals and others desiring assistance, as set forth in claim 18, wherein at least a portion of said generally flat platform on the front portion of the frame is inclined upwardly and forwardly.

20. The four-wheeled cart, for physically challenged individuals and others desiring assistance, as set forth in claim 17 wherein said drive mechanism for controlling the electric motor includes a potentiometer mounted on the frame and operably connected to the first and second steerable frame supporting front wheels.

21. The four-wheeled cart, for physically challenged individuals and others desiring, assistance, as set forth in claim 20, wherein at least a portion of said generally flat platform on the front portion of the frame is inclined upwardly and forwardly.

22. The four-wheeled cart, for physically challenged individuals and others desiring assistance as set forth in claim 11, including a potentiometer mounted on the frame, a potentiometer control arm extending outwardly from the potentiometer, and a connection between the torque transmission drive wheel mechanism and the potentiometer control arm operable to move the potentiometer control arm in response to rotation of the torque transmission drive wheel.

* * * * *

UNITED STATES PATENT AND TRADEMARK OFFICE

CERTIFICATE OF CORRECTION

PATENT NO. : 5,322,140

DATED : June 21, 1994

INVENTOR(S) : Allen L. Bussinger

It is certified that error appears in the above-indentified patent and that said Letters Patent is hereby corrected as shown below:

Column 4, line 55, change "gear" to -- gears --.

Column 7, line 30, change "wheels" to -- wheeled --;

line 31, change "other" to -- others --.

Column 8, line 57, after "arm" insert -- operable to move the potentiometer control arm --;

Column 10, line 38, change "desiring, assistance" to -- desiring assistance --.

Signed and Sealed this

Twenty-seventh Day of September, 1994

Attest:

BRUCE LEHMAN

Attesting Officer

*Commissioner of Patents and Trademarks*